(12) United States Patent
Li et al.

(10) Patent No.: US 8,456,848 B2
(45) Date of Patent: Jun. 4, 2013

(54) COMPUTER ENCLOSURE HAVING EXPANSION CARD RETENTION FRAME

(75) Inventors: Zhi-Xin Li, Shenzhen (CN); Jun-Xiong Zhang, Shenzhen (CN); You-Tao Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 270 days.

(21) Appl. No.: 12/978,546

(22) Filed: Dec. 25, 2010

(65) Prior Publication Data

US 2011/0254414 A1  Oct. 20, 2011

(30) Foreign Application Priority Data

Apr. 15, 2010  (CN) .......................... 2010 1 0147748

(51) Int. Cl.
*H05K 5/00* (2006.01)
(52) U.S. Cl.
USPC ............................ 361/732; 361/728; 361/802

(58) Field of Classification Search
USPC ......... 361/728–730, 752, 796, 732, 800–802; 312/223.1, 223.2; 211/41.17
See application file for complete search history.

(56) References Cited

U.S. PATENT DOCUMENTS

| | | | | |
|---|---|---|---|---|
| 6,058,025 A * | 5/2000 | Ecker et al. | ................... | 361/816 |
| 6,138,839 A * | 10/2000 | Cranston et al. | ........... | 211/41.17 |
| 7,130,200 B1 * | 10/2006 | Liu | ............................... | 361/801 |
| 7,742,291 B2 * | 6/2010 | Wu et al. | .................. | 361/679.32 |

* cited by examiner

*Primary Examiner* — Hung S Bui
(74) *Attorney, Agent, or Firm* — Altis Law Group, Inc.

(57) ABSTRACT

A computer enclosure includes a shell body, and an expansion card retention assembly. The shell body includes a main chassis, and a side wall perpendicular to the main chassis. The side wall defines an elongated through hole extending along a first direction perpendicular to the main chassis. The expansion card retention assembly includes a first and second expansion frames fixed on the side wall. The first expansion frame includes a main board with a length in the first direction less than that of the through hole, and is configured for fixing a first expansion card. The second expansion frame includes an elongated main plate extending along the first direction, and a first support platform perpendicularly extending from an end of the main plate. The main plate and the first support platform are configured for matingly engaging with an expansion card bracket of a second expansion card.

16 Claims, 7 Drawing Sheets

COMPUTER ENCLOSURE HAVING EXPANSION CARD RETENTION FRAME

BACKGROUND

1. Technical Field

The present disclosure relates to computer enclosures, and more especially, to a computer enclosure having an expansion card retention frame.

2. Description of Related Art

With the development of information processing technology, electronic devices such as personal computers are now widely used. Expansion cards such as network cards, sound cards, and small computer system interface cards (SCSIs) having special circuits are widely used in the electronic devices to enhance or specialize their functions.

Referring now to FIG. 7, a typical retention assembly for securing an expansion card 10 to a computer enclosure 100 is shown. The enclosure 100 includes a main chassis 12, and a side wall 14 perpendicular to the main chassis 12. A main circuit board 122, for example a motherboard, is positioned on the main chassis 12. The main circuit board 122 defines a plurality of expansion slots 1222, and the expansion slots 1222 are aligned substantially parallel to each other. The retention assembly includes an expansion frame 16 formed on the side wall 14. Each expansion frame 16 defines a screw hole 164. A screw 18 may be engaged in the expansion frame 16. The expansion frame 16 defines a plurality of expansion seats 162 corresponding to the expansion slots 1222. The expansion card 10 includes an expansion card circuit board 102, and an expansion card bracket 104 extending from one end of expansion card circuit board 102. The expansion card bracket 104 has a flange 106 formed at an end thereof. A notch 108 is defined on the flange 106.

In use, the expansion card 10 is received in the enclosure 100, with the expansion card circuit board 102 inserted in the expansion slot 1222, and the expansion card bracket 104 seated in the expansion seat 162. The notch 108 is aligned with the screw hole 164. The screw 18 passes through the notch 108 of the expansion card 10, and is finally received in the screw hole 164 of the expansion frame 16. Thus, the expansion card bracket 104 of the expansion card 10 is held steadily in the expansion frame 16, and the expansion card 10 is held in the enclosure 100. A plurality of expansion cards 10 can be received in the enclosure 100 in this way. The expansion card 10 can be removed after taking out the screw 18 from the enclosure 100.

However, different expansion cards vary in sizes. Sometimes, a converter card is arranged between the expansion slot 1222 and the expansion card 10. Thus the position of the expansion card bracket 104 is raised in respect to the expansion frame 16. The expansion card 10 cannot be held steadily in the expansion frame 16 because of this.

Therefore, there is a need for a computer enclosure having an expansion card retention frame, overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
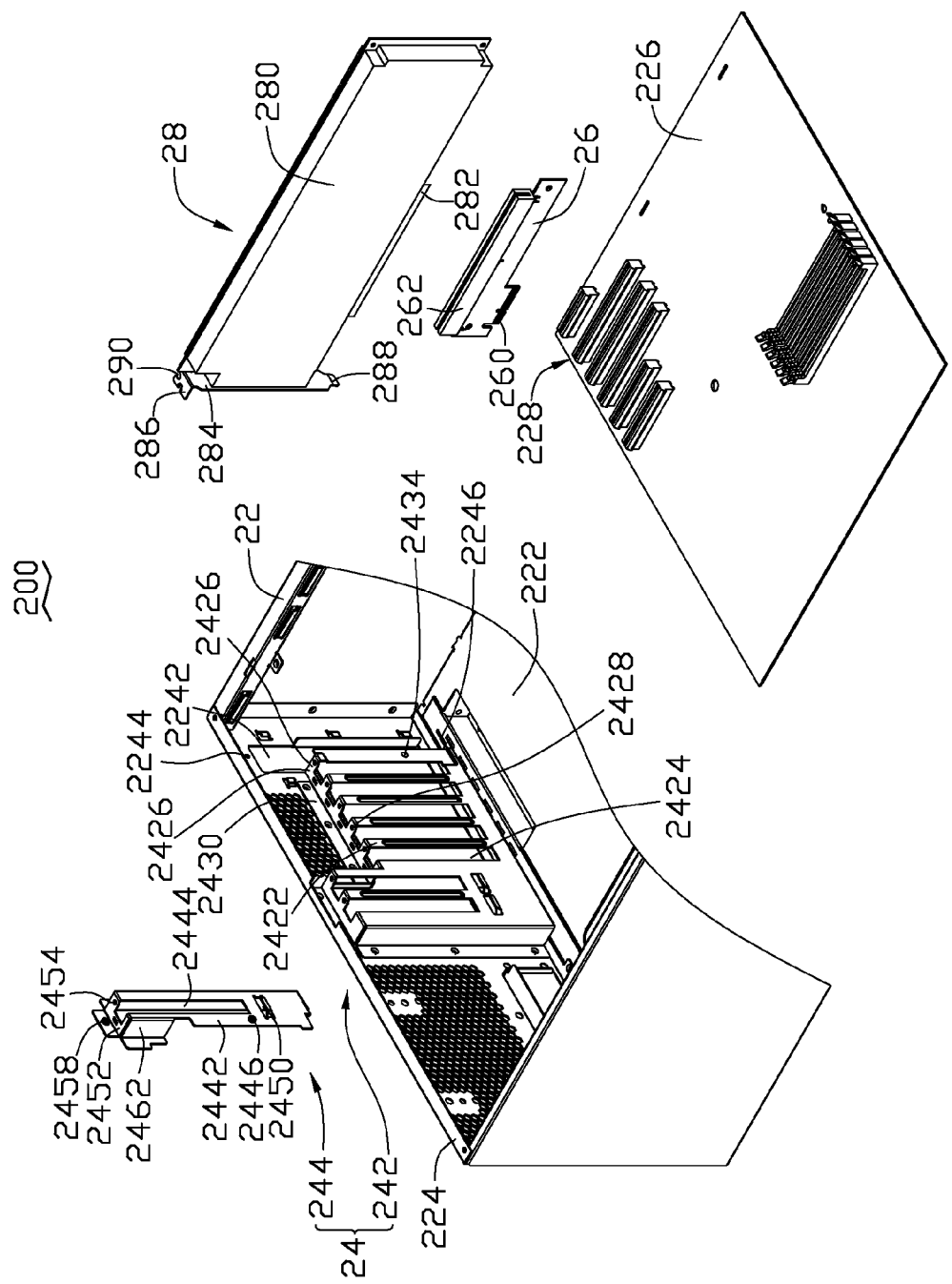
FIG. 1 is an isometric, exploded view of a computer enclosure having an expansion card retention assembly in accordance with a first exemplary embodiment.
Figure 2:
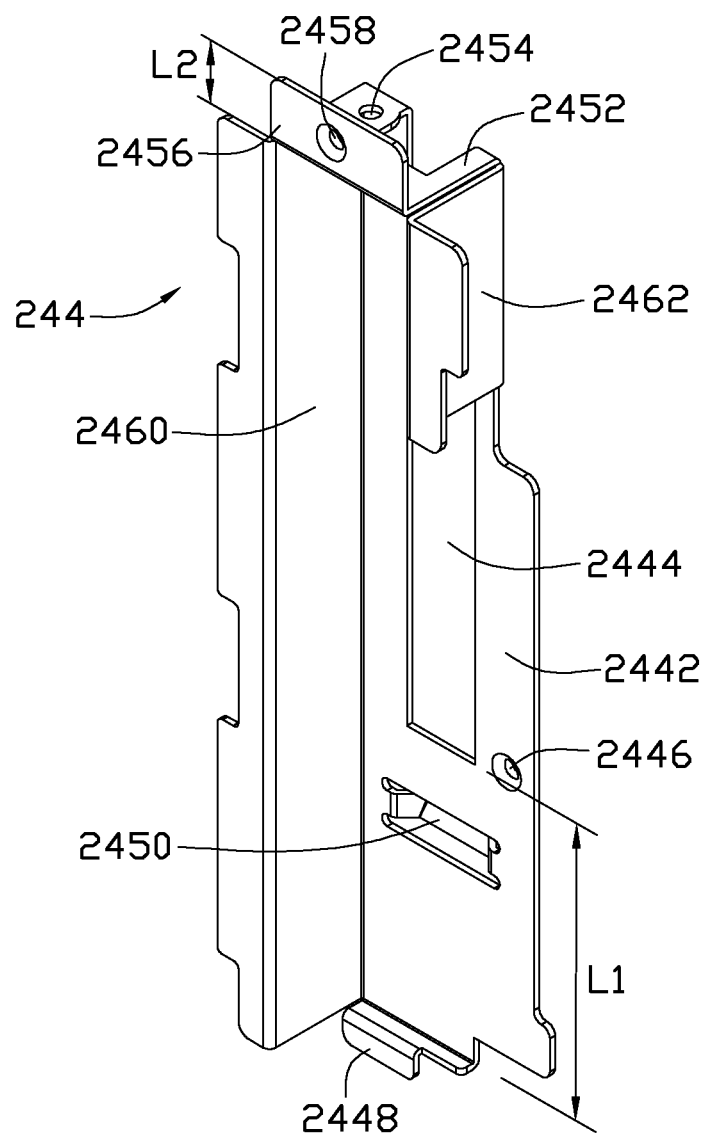
FIG. 2 is a schematic, isometric view of an expansion card retention assembly of the computer enclosure of FIG. 1.
Figure 3:
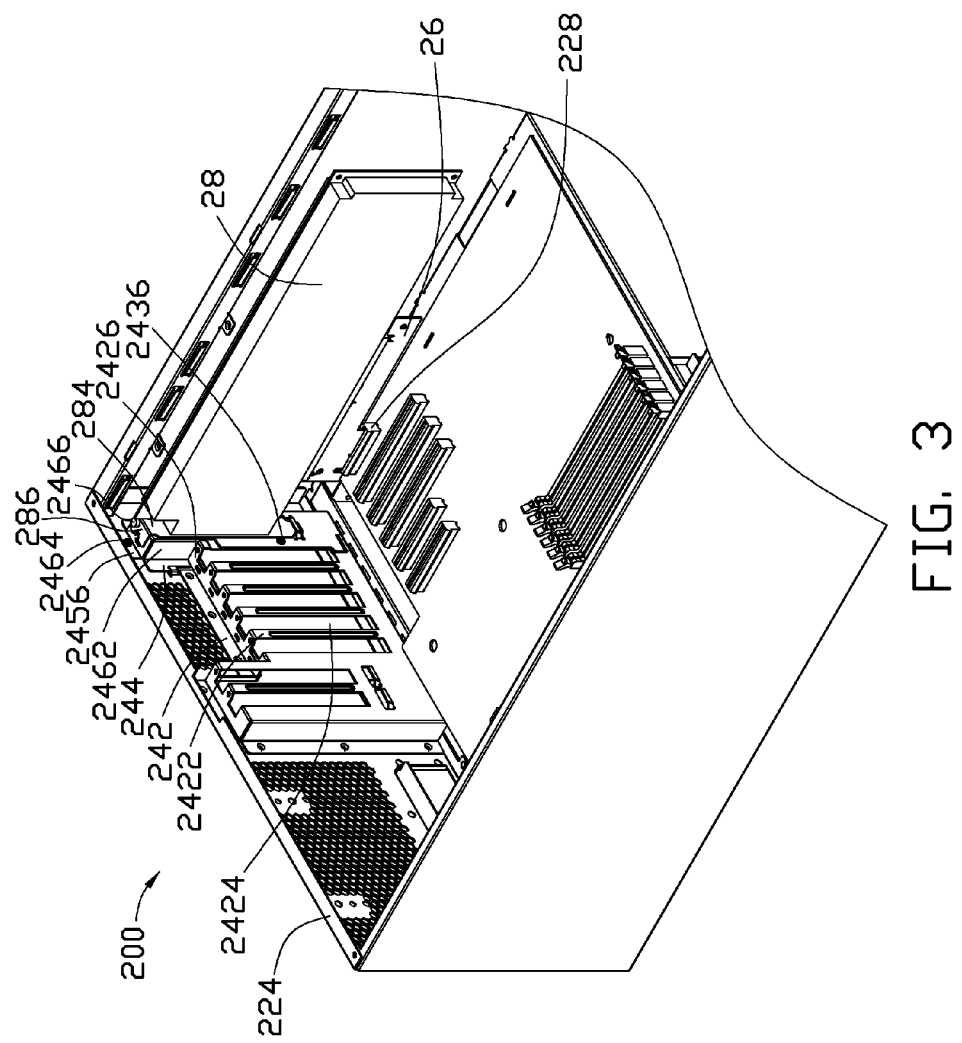
FIG. 3 is an isometric, assembled view of the computer enclosure of FIG. 1, showing that an expansion card is assembled in the computer enclosure.

Referring to FIGS. 1 to 3, a computer enclosure 200 in accordance with a first exemplary embodiment includes a shell body 22, and an expansion card retention assembly 24. In this embodiment, an inverter card 26 and an expansion card 28 are incorporated in the computer enclosure 200.

The shell body 22 includes a main chassis 222, and a side wall 224 perpendicularly extending from an edge of the main chassis 222. In this embodiment, the main chassis 222 is placed on a horizontal surface. A main circuit board 226, for example a motherboard, is positioned on the main chassis 222. The main circuit board 226 defines a plurality of expansion slots 228. The expansion slots 228 are aligned parallel to each other and are perpendicular to the side wall 224. The expansion slot 228 can be a PCI (peripheral component interconnect) slot, a PCI-Express slot, or a PCI-X slot.

The expansion card retention assembly 24 includes a first expansion frame 242 and a second expansion frame 244. The first expansion frame 242 is formed on the side wall 224. The first expansion frame 242 includes a main board 2422, and a support platform 2426 perpendicularly extending from one end of the main board 2422. A mounting tab 2430 extends perpendicularly from an end of the support platform 2426 opposite to the main board 2422. The main board 2422 defines a plurality of assembly slots 2424 each corresponding to one of the expansion slots 228. The number of the assembly slots 2424 is one less than that of the expansion slots 228. The remaining one of the expansion slots 228 corresponds to the second expansion frame 244. The support platform 2426 is perpendicular to the assembly slots 2424, and the assembly slots 2424 are exposed at the support platform 2426.

The mounting tab 2430 abuts against the side wall 224, and is attached (e.g. screwed) to the side wall 224. Thus the first expansion frame 242 is fixed on the side wall 224. A plurality of positioning holes 2428 are defined on the support platform 2426. The support platform 2426 defines a plurality of positioning holes 2428 thereon corresponding to the assembly slot 2424. The expansion card 10 can be mounted on the first expansion frame 242. When the expansion card 10 is inserted in one expansion slot 228, the expansion card bracket 104 covers the corresponding assembly slot 2424 and abuts against the main board 2422, and the flange 106 abuts against the support platform 2426 with the notch 108 of the expansion card bracket 104 correspondingly aligned with the positioning hole 2428. A bolt (not shown) passes through the notch 108, and finally is received in the corresponding positioning hole 2428. A head portion of the bolt presses the flange 106 on the support platform 2426, thereby fixing the expansion card 10 on the first expansion frame 242.

The second expansion frame 244 includes an elongated main plate 2442, a support platform 2452 perpendicularly extending from one end of the main plate 2442 at the lengthwise direction thereof, and a mounting tab 2456 perpendicularly extending from one end of the support platform 2452 opposite to the main plate 2442. The main plate 2442 defines a lengthwise assembly slot 2444 along the lengthwise direction of the main plate 2442. The assembly slot 2444 is exposed at and perpendicular to the support platform 2452, and has a substantially equal length to that of the assembly slot 2424 of the first expansion frame 242. In this embodiment, the main plate 2442 defines a first distance L1 from the end of the assembly slot 2444 away from the support platform 2452 to an opposite end of the main plate 2442. The mounting tab 2456 defines a second distance L2 from one end thereof adjacent to the support platform 2452 to an opposite end thereof. In this embodiment, the first distance L1 is larger than the second distance L2.

The second expansion frame 244 further includes a first shelter plate 2460, a second shelter plate 2462 and a protruding tab 2448. The first shelter plate 2460 and the second shelter plate 2462 perpendicularly extend from two opposite lateral sides of the main plate 2442 adjacent to the support platform 2452. The first shelter plate 2460, the second shelter plate 2462, and the support platform 2452 are arranged at a same side of the main plate 2442. The first shelter plate 2460 has a length substantially equal to that of the main plate 2442. The second shelter plate 2462 starts from one edge of the support platform 2452, and is shorter than the first shelter plate 2460. The main plate 2442 of the second expansion frame 244 is longer than the main board 2422 of the first expansion frame 242. The second shelter plate 2462 has a length substantially equal to a length difference between the main plate 2442 and the main board 2422. The protruding tab 2448 extends from another end of main plate 2442 in a direction away from the support platform 2452.

The main plate 2442 defines a tab slot 2450 adjacent to one end of the assembly slot 2444 away from the support platform 2452, and a first fixing hole 2446 for fixing the main plate 2442 to the first expansion frame 242. The support platform 2452 defines a second fixing hole 2454 for fixing the expansion card 28 to the second expansion frame 244. The mounting tab 2456 defines a third fixing hole 2458 for fixing the second expansion frame 244 to the side wall 224.

The side wall 224 defines an elongated through hole 2242 adjacent to the first expansion frame 242 parallel to the extended direction of the assembly slots 2424 of the first expansion frame 242. The through hole 2242 has a length substantially equal to the length of the main plate 2442. The side wall 224 further defines a tab slot 2246 adjacent to an end of the through hole 2242 adjacent to the main chassis 222, and a receiving hole 2244 adjacent to an opposite end of the through hole 2242. The main board 2422 defines a receiving hole 2434 at an edge thereof adjacent to the through hole 2242.

In use, the second expansion frame 244 is fixed on the side wall 224, with the third fixing hole 2458 aligns with the receiving hole 2244, the first fixing hole 2446 of the second expansion frame 244 aligns with the receiving hole 2434, and the protruding tab 2448 is inserted in the tab slot 2246. A screw/bolt 2464 may pass through the third fixing hole 2458 and the receiving hole 2244, and a screw/bolt 2436 may pass through the first fixing hole 2446 and the receiving hole 2434, thereby the second expansion frame 244 is fixed to the side wall 224. One end of the main plate 2442 adjacent to the main chassis 222 is generally aligned with that of the main board 2422 adjacent to the main chassis 222. One end of the second shelter plate 2462 abuts against the support platform 2426 for sheltering the first expansion frame 242. The first and second shelter plate 2460 and 2462 are cooperatively configured for preventing from exposing elements in the computer enclosure 200 to exterior. The support platform 2452 has a higher position than the support platform 2426. The lengthwise assembly slot 2444 extends parallel to the assembly slots 2424 of the first expansion frame 242.

The converter card 26 includes a first card plug 260 extending from an end thereof, and a converter slot 262 formed at an opposite end thereof. The expansion card 28 includes an expansion card circuit board 280, a second card plug 282 extending from an end thereof and an expansion card bracket 284 extending from another end thereof. The expansion card bracket 284 has a flange 286 formed at an end thereof, a tab 288 formed at an opposite end thereof. A notch 290 is defined on the flange 286. In this embodiment, the second card plug 282 of the expansion card 28 does not match the expansion slot 228. Therefore, the converter card 26 is provided for matching both of the first card plug 260 and the second card plug 282.

When assembling the converter card 26 and the expansion card 28, the first card plug 260 is inserted in the expansion slot 228 corresponding to the second expansion frame 244, and then the second card plug 282 is inserted in the converter slot 262. The tab 288 of expansion card bracket 284 is received in the tab slot 2450 of the second expansion frame 244, the expansion card bracket 284 abuts against the main plate 2442, and the flange 286 abuts against the support platform 2452, with the notch 290 aligned with the second fixing hole 2454. A screw/blot 2466 passes through the notch 290 and then is received in the second fixing hole 2454, thereby fixing the expansion card 28 on the second expansion frame 244.

Figure 4:
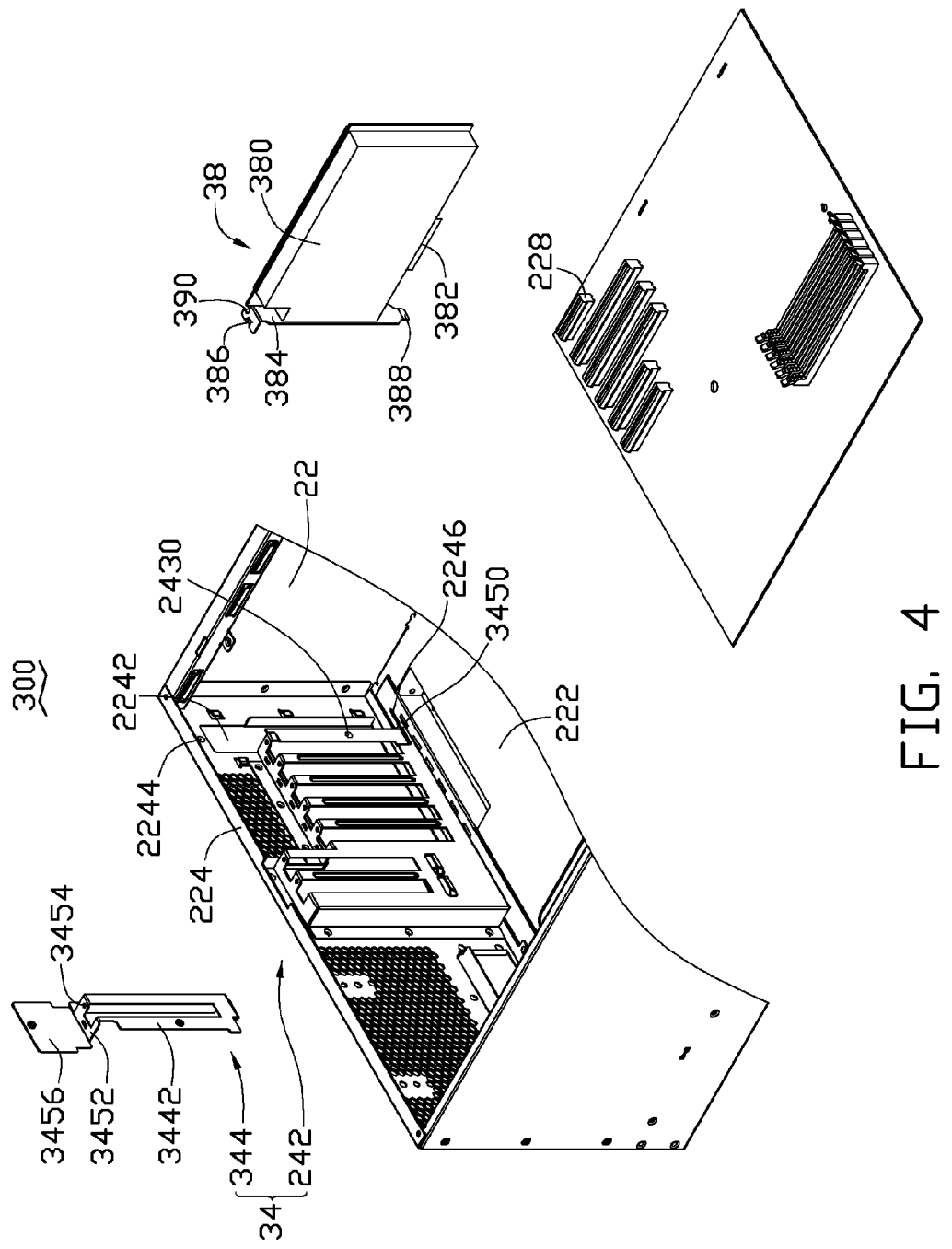
FIG. 4 is an isometric, exploded view of a computer enclosure having an expansion card retention assembly in accordance with a second exemplary embodiment.
Figure 5:
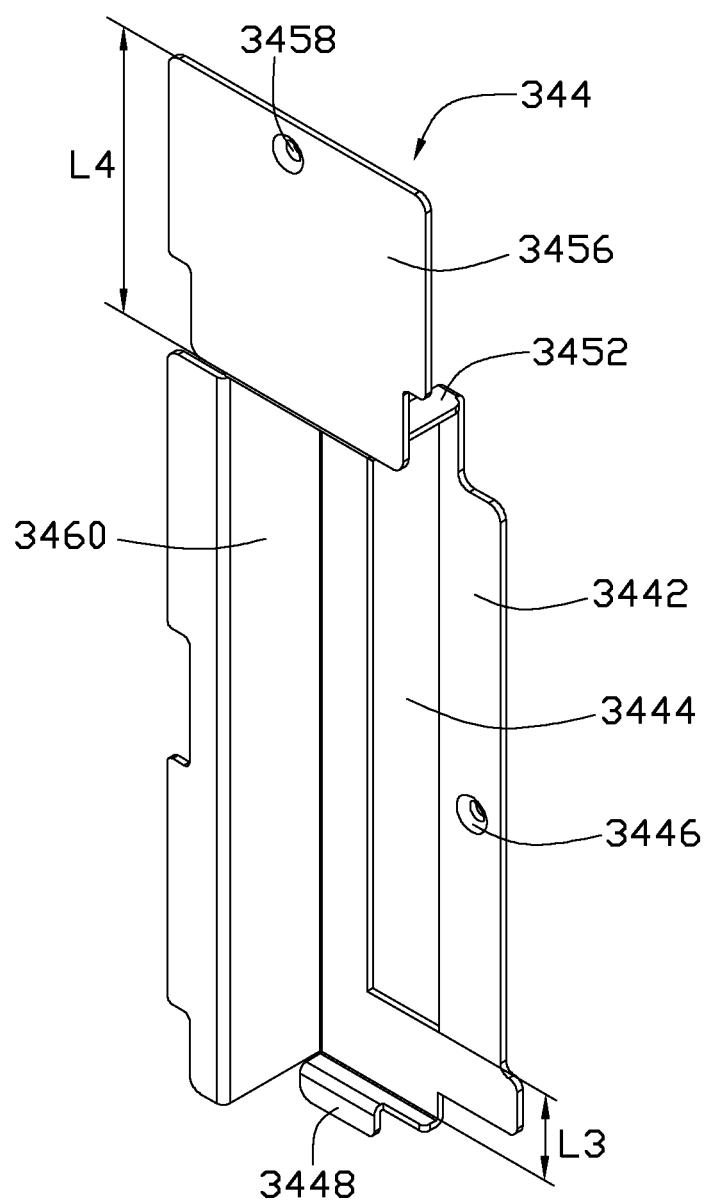
FIG. 5 is a schematic, isometric view of an expansion card retention assembly of the computer enclosure of FIG. 4.
Figure 6:
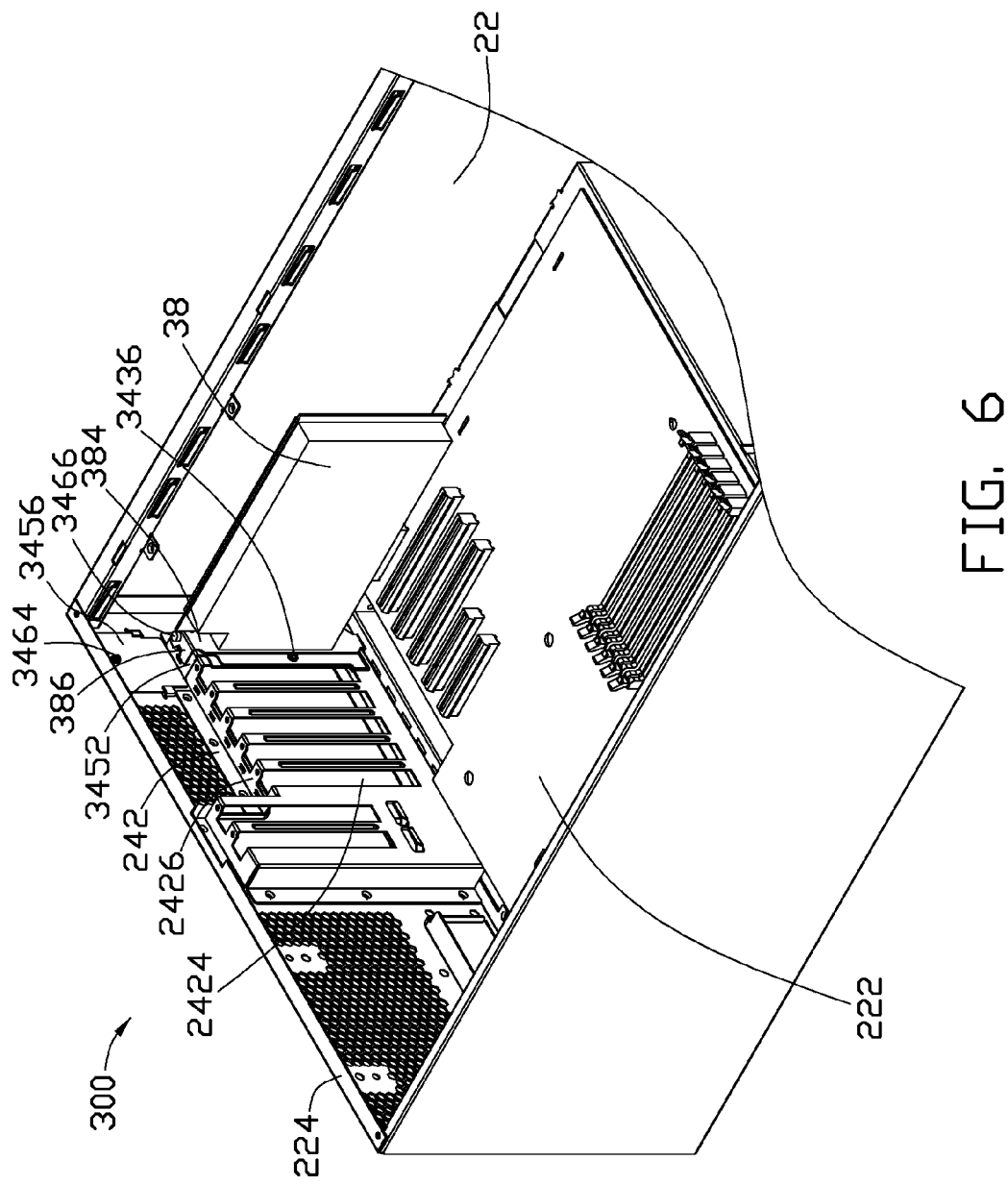
FIG. 6 is an isometric, assembled view of the computer enclosure of FIG. 1, showing that an expansion card and a converter card are assembled in the computer enclosure.
Figure 7:
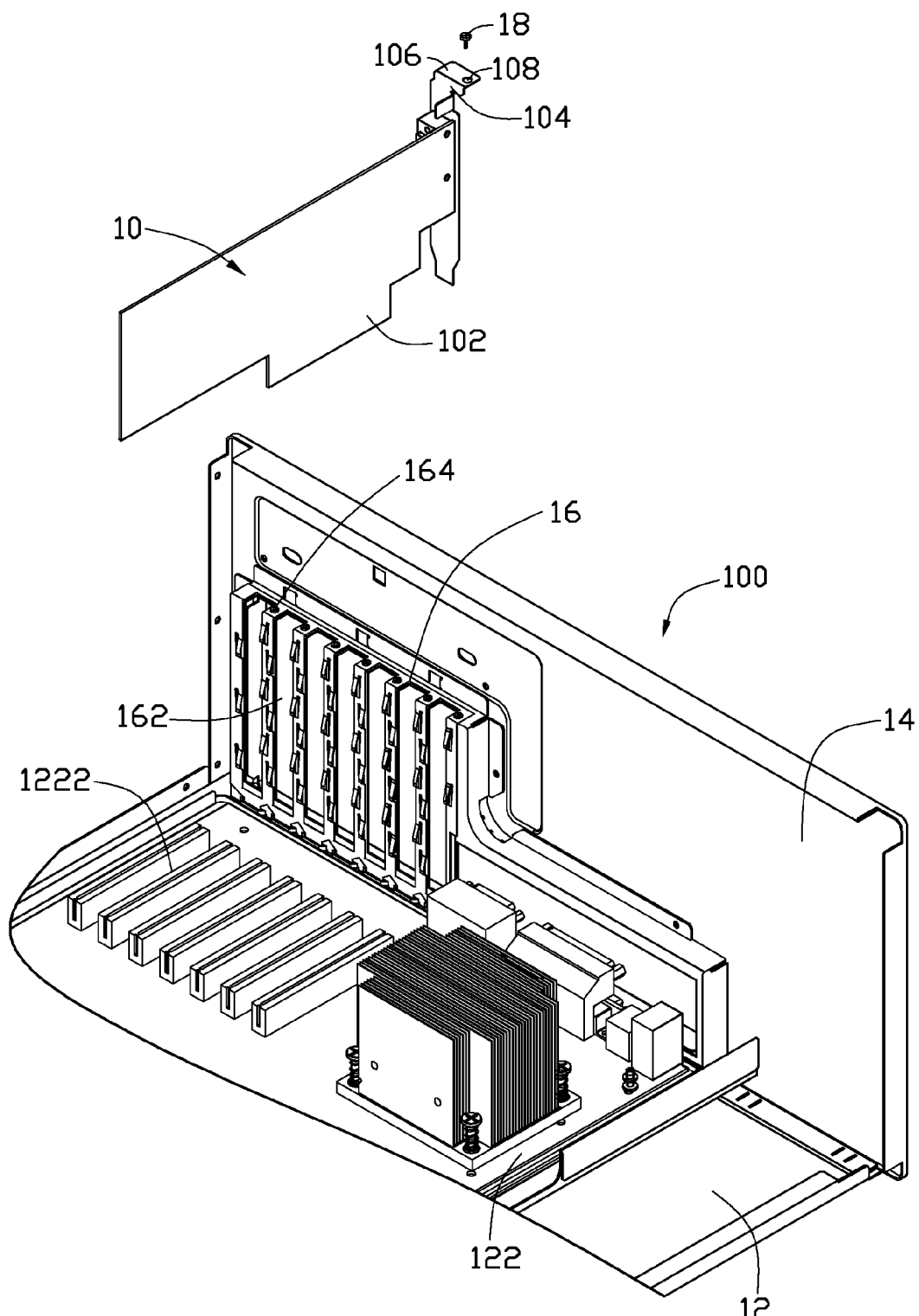
FIG. 7 is an isometric, exploded view of a conventional computer enclosure.

Referring to FIGS. 4 to 6, a computer enclosure 300 in accordance with a second exemplary embodiment includes a shell body 22 identical to that of the first exemplary embodiment, and an expansion card retention assembly 34. The expansion card retention assembly 34 includes a first expansion frame 242 identical to that of the first embodiment, and a second expansion frame 344. In this embodiment, the second expansion frame 344 is configured for fixing an expansion card 38.

The expansion card 38 includes an expansion card circuit board 380, a card plug 382 extending from an end thereof and an expansion card bracket 384 extending from another end thereof. The expansion card bracket 384 has a flange 386 formed at an end thereof, a tab 388 formed at an opposite end thereof. A notch 390 is defined on the flange 386. In this embodiment, the card plug 382 of the expansion card 38 matches the expansion slot 228.

The second expansion frame 344 includes an elongated main plate 3442, a support platform 3452 perpendicularly extending from one end of the main plate 3442 at the lengthwise direction thereof, and a mounting tab 3456 perpendicularly extending from one end of the support platform 3452 opposite to the main plate 3442. The main plate 3442 defines a lengthwise assembly slot 3444 along the lengthwise direction of the main plate 3442. The assembly slot 3444 is exposed at and perpendicular to the support platform 3452, and has a substantially equal length to that of the assembly slot 2424. In this embodiment, the main plate 3442 defines a third distance L3 from the end of the assembly slot 3444 away from the support platform 3452 to the opposite end of the main plate. The mounting tab 3456 defines a fourth distance L4 from one end thereof adjacent to the support platform 3452 to an opposite end thereof. In this embodiment, the third distance L3 is shorter than the fourth distance L4. It is seen that, a length of the main plate 3442 plus the mounting tab 3456 is substantially equal to that of main plate 2442 plus the mounting tab 2456 of the first exemplary embodiment.

The second expansion frame 344 further includes a shelter plate 3460 perpendicularly extending from a lateral side of main plate 3442 adjacent to the support platform 3452, and a protruding tab 3448. The shelter plate 3460 has a length substantially equal to that of the main plate 3442. The main plate 3442 of the second expansion frame 344 has a length substantially equal to that of the main board 2422 of the first expansion frame 242. The protruding tab 3448 extends from another end of main plate 3442 in a direction away from the support platform 3452.

The main plate 3442 defines a first fixing hole 3446 for fixing the main plate 3442 to the first expansion frame 242. The support platform 3452 defines a second fixing hole 3454 for fixing the expansion card 38 to the second expansion frame 344. The mounting tab 3456 defines a third fixing hole 3458 for fixing the second expansion frame 344 to the side wall 224.

In use, the second expansion frame 344 is fixed on the side wall 224, with the third fixing hole 3458 aligned with the receiving hole 2244, the first fixing hole 3446 of the second expansion frame 344 aligned with the receiving hole 2434, and the protruding tab 3448 inserted in the tab slot 2246. A screw/bolt 3464 may pass through the third fixing hole 3458 and the receiving hole 2244, and a screw/bolt 3436 may pass through the first fixing hole 3446 and the receiving hole 2434, thereby the second expansion frame 344 is fixed to the side wall 224. Two ends of the main plate 3442 are respectively aligned with two ends of the main board 2422. The shelter plate 3460 can prevent from exposing elements in the computer enclosure 300 to exterior. The lengthwise assembly slot 3444 extends parallel to the assembly slots 2424 of the first expansion frame 242.

When assembling the expansion card 38, the card plug 382 is inserted in the expansion slot 228, and the tab 388 is received in the tab slot 2246 defined on the side wall 224. The expansion card bracket 384 abuts against the main plate 3442. The flange 386 abuts against the support platform 3452, with the notch 390 aligned with the second fixing hole 3454. A screw/bolt 3466 passes through the notch 390 and then is received in the second fixing hole 3454, thereby fixing the expansion card 38 on the second expansion frame 344.

In the embodiments of the disclosure, the second expansion frame 244 and 344 are used for fixing expansion cards with their expansion card brackets at different heights. Also, the second expansion frame 244 and 344 are detachable from the side wall 224. It is seen that, by varying the length of the main plate 2442 or 3442, expansion cards with their expansion card brackets at different heights.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A computer enclosure, comprising:
    a shell body comprising a main chassis, and a side wall perpendicularly extending from an edge of the main chassis, the main chassis configured for fixing a main circuit board thereto, the side wall defining an elongated through hole extending along a first direction perpendicular to the main chassis; and
    an expansion card retention assembly for fixing a first expansion card and a second expansion card, the second expansion card comprising an expansion card bracket, the expansion card retention assembly comprising:
        a first expansion frame fixed on the side wall and adjacent to the through hole, the first expansion frame comprising a main board with a length in the first direction less than that of the through hole, the first expansion frame being configured for fixing the first expansion card, and
        a second expansion frame fixed on the side wall, the second expansion frame comprising an elongated main plate extending along the first direction, a first support platform perpendicularly extending from an end of the main plate, and a mounting tab perpendicularly extending from an opposite end of the first support platform along the extending direction of the first support platform to the main plate, the main plate defining a lengthwise assembly slot parallel to the first direction, the assembly slot being exposed at the first support platform, the assembly slot being coverable by the expansion card bracket, the mounting tab being fixed on the side wall, the assembly slot being aligned with and in communication with the elongated through hole, the main plate and the first support platform being configured for matingly engaging with the expansion card bracket of the second expansion card.

2. The computer enclosure of claim 1, wherein the first expansion frame further comprises a second support platform perpendicularly extending from an end of the main board, the main board and the second support platform being configured for matingly engaging an expansion card bracket of the first expansion card.

3. The computer enclosure of claim 1, wherein the main plate and the main board are aligned along an edge of the main chassis.

4. The computer enclosure of claim 1, wherein the main plate has a length in the first direction substantially equal to that of the main board of the first expansion frame.

5. The computer enclosure of claim 4, wherein the second expansion frame further comprises a shelter plate perpendicularly extending from the main plate, the shelter plate being configured for preventing from exposing elements in the computer enclosure to exterior.

6. The computer enclosure of claim 1, wherein the main plate has a length in the first direction larger than that of the main board of the first expansion frame.

7. The computer enclosure of claim 6, wherein the main plate defines a first tab slot configured for receiving a tab of the expansion card bracket of the second expansion card.

8. The computer enclosure of claim 7, wherein the second expansion frame further comprises a protruding tab extending from an end of the main plate in a direction away from the first support platform, the side wall defining a second tab slot, the second tab being received in the second tab slot for positioning the second expansion frame on the side wall.

9. The computer enclosure of claim 8, wherein the assembly slot is aligned with the first tab slot along the first direction.

10. The computer enclosure of claim 6, wherein the second expansion frame further comprises two shelter plates perpendicularly extending from opposite lateral sides of the main plate, the shelter plates extending parallel to the first direction for preventing from exposing elements in the computer enclosure to exterior.

11. A computer enclosure, comprising:
   a shell body comprising a main chassis, and a side wall perpendicularly extending from an edge of the main chassis, the main chassis configured for fixing a main circuit board thereto, the side wall defining an elongated through hole extending along a first direction perpendicular to the main chassis; and
   an expansion card retention assembly for fixing a first expansion card and a second expansion card, the second expansion card comprising an expansion card bracket, the expansion card retention assembly comprising:
      a first expansion frame fixed on the side wall and adjacent to the through hole, the first expansion frame comprising a main board with a length in the first direction less than that of the through hole, the first expansion frame being configured for fixing the first expansion card, and
      a second expansion frame fixed on the side wall, the second expansion frame comprising an elongated main plate extending along the first direction, a first support platform perpendicularly extending from an end of the main plate, and a mounting tab perpendicularly extending from an opposite end of the first support platform to the main plate, the main plate having a length in the first direction larger than that of the main board of the first expansion frame and defining a first tab slot configured for receiving a tab of the expansion card bracket of the second expansion card, the mounting tab being fixed on the side wall, the main plate and the first support platform being configured for matingly engaging with the expansion card bracket of the second expansion card.

12. The computer enclosure of claim 11, wherein the second expansion frame further comprises a protruding tab extending from an end of the main plate in a direction away from the first support platform, the side wall defining a second tab slot, the second tab being received in the second tab slot for positioning the second expansion frame on the side wall.

13. The computer enclosure of claim 12, wherein the assembly slot is aligned with the first tab slot along the first direction.

14. The computer enclosure of claim 11, wherein the main plate defines a lengthwise assembly slot parallel to the first direction, the assembly slot being exposed at the first support platform, the assembly slot being configured for being covered by the expansion card bracket.

15. The computer enclosure of claim 11, wherein the second expansion frame further comprises two shelter plates perpendicularly extending from opposite lateral sides of the main plate, the shelter plates extending parallel to the first direction preventing exposure to the elements of the computer enclosure.

16. A computer enclosure, comprising:
   a shell body comprising a main chassis, and a side wall perpendicularly extending from an edge of the main chassis, the main chassis configured for fixing a main circuit board thereto, the side wall defining an elongated through hole extending along a first direction perpendicular to the main chassis; and
   an expansion card retention assembly for fixing a first expansion card and a second expansion card, the second expansion card comprising an expansion card bracket, the expansion card retention assembly comprising:
      a first expansion frame fixed on the side wall and adjacent to the through hole, the first expansion frame comprising a main board with a length in the first direction less than that of the through hole, the first expansion frame being configured for fixing the first expansion card, and a second expansion frame fixed on the side wall, the second expansion frame comprising an elongated main plate extending along the first direction, a first support platform perpendicularly extending from an end of the main plate, a mounting tab perpendicularly extending from an opposite end of the first support platform to the main plate, and a shelter plate perpendicularly extending from the main plate, the main plate has a length in the first direction substantially equal to that of the main board of the first expansion frame, the mounting tab being fixed on the side wall, the main plate and the first support platform being configured for matingly engaging with the expansion card bracket of the second expansion card, the shelter plate being configured for preventing exposure to elements in the computer enclosure.

* * * * *